United States Patent [19]
Belloc et al.

[11] Patent Number: 4,887,258
[45] Date of Patent: Dec. 12, 1989

[54] ECHO CANCELLING DEVICE WITH PHASE-ROLL CORRECTION

[75] Inventors: Jacques Belloc, Antibes; Dominique Godard, LeRouret; Emile Morlec, St. Paul; Michel Quintin, LaGaude, all of France

[73] Assignee: International Business Machines Corporation, Armonk, N.Y.

[21] Appl. No.: 164,305

[22] Filed: Mar. 4, 1988

[30] Foreign Application Priority Data

Apr. 22, 1987 [EP] European Pat. Off. ........ 87430015.5

[51] Int. Cl.$^4$ ............................................... H04B 3/23
[52] U.S. Cl. ..................................... 370/32.1; 379/410
[58] Field of Search .................... 379/406, 410, 411; 370/32, 32.1

[56] References Cited
FOREIGN PATENT DOCUMENTS

0036696 9/1981 European Pat. Off. ........... 370/32.1

Primary Examiner—Jin F. Ng
Assistant Examiner—Randall S. Vaas
Attorney, Agent, or Firm—John J. Timar

[57] ABSTRACT

Echo cancelling above for providing an echo-free incoming data signal with a phase-roll tracking device comprising phase rotating means (58) for rotating the phase of the generated echo signal by a value X which is the estimated phase-roll value, thereby providing a complex phase-roll corrected echo signal a multiplier (124) for multiplying the error signal; between the incoming signal and the real component (112) of the phase-roll corrected echo signal by the imaginary component (120) of the same signal, thereby providing a value Y function of the variation of the phase-roll; a phase-roll variation estimator (128) providing an estimation Z of the phase-roll variation in half duplex mode or in full duplex mode, in response to value Y; and a phase filter (126) providing the estimated phase-roll value X in response to the estimation Z.

5 Claims, 10 Drawing Sheets

ECHO CANCELLING DEVICE WITH PHASE-ROLL CORRECTION

BACKGROUND OF THE INVENTION

The present invention deals with the data transmission in full duplex on a two-wire line, and relates particularly to an echo cancelling device including a phase-roll correction circuit.

A family of modems is for use on connections between data terminal equipments by means of the switched telephone network. The data signals are transmitted from a transmitting modem to a receiving modem over a two-wire line. For long distances, amplifiers (repeaters) are required. Since amplifiers only operate in one direction, the data directions are split up to separate the two-wire line into a four-wire line. The connection between two and four-wire lines, and vice-versa, is made through so called hybrid couplers. Likewise, an hybrid coupler is required to connect the modem output comprising the transmitting circuit and the receiving circuit, to the two-wire line.

An hybrid coupler is a terminating set consisting of two differential transformers with three inputs, an input for each two-wire circuit of the four-wire line, and an input for the two-wire line. Because these transformers cannot be loaded with an impedance matched throughout the overall frequency bandwidth, a portion of the data signal energy goes over to the other direction and returns to the sender through the two-wire line, generating so called echoes.

Two kinds of echoes are received by the modem : the near echo resulting from the transmitted data signal leaking directly through the modem hybrid coupler toward the receiving circuit of the modem, and the far echo resulting from the transmitted data signal passing through the four-wire line and reflecting on a far hybrid coupler.

Therefore, the modems of this type are provided with echo cancellers to cancel from the incoming signal echoes of the outgoing signal. Because near and far echoes have different characteristics, it is classical to have the near echo canceller different from the far echo canceller, the outputs of both echo cancellers being added to provide an estimated value of the actual echo. This resulting estimated value is then subtracted from the incoming signal to provide theoretically the incoming signal free of echo. The error signal between the estimated and actual values of the echo is generally used to adjust the coefficients of the echo cancellers.

In this type of transmission utilizing the switched telephone network the far echo is also affected by a frequency shift. Indeed, the data signal can be frequency switched one or more times, in the equipments of the switched telephone network. As these equipments are not sufficiently interdependent the signal which comes back to the transmitting modem is no longer maintained at the carrier frequency of the latter modem. It results that the phase of the far echo is affected by the so called phase-roll, that is the phase is time variable. The resulting frequency shift is generally low, about 0.1Hz. Such a frequency shift is easily compensated by the adjusting algorithms of the echo canceller, as it is the case for telephone conversation where echo cancellers are continuously in operation since the transmission is always half-duplex (both parties are never talking simultaneously). Unfortunately, in the data transmission over the two-wire lines of the switched telephone network, the adjustment of the echo canceller coefficients cannot be made with sufficient speed and precision during the full duplex transmission.

SUMMARY OF THE INVENTION

It is therefore the purpose of the invention to provide a phase-roll correction during both half and full duplex transmission of data between two modems over the two-wire lines of the switched telephone network.

The object of the present invention is thus an echo cancelling device including a phase-roll tracking device comprised of phase rotating means for rotating the phase of the generated echo signal by a value X which is the estimated phase-roll value, thereby providing a complex signal representative of the generated phase-roll corrected echo signal, multiplying means for multiplying the error signal between the incoming signal and the real component of the phase-roll corrected signal by the imaginary component of the phase-roll corrected signal, thereby providing a value Y representative of the variation of the phase-roll, a phase variation estimator providing an estimation Z of the phase-roll variation X in half duplex as well as in full duplex, in response to value Y, and a phase filter providing the estimated phase-roll value X in response to the phase-roll variation Y.

DETAILED DESCRIPTION OF THE PREFERRED EMBODIMENT

Figure 1:
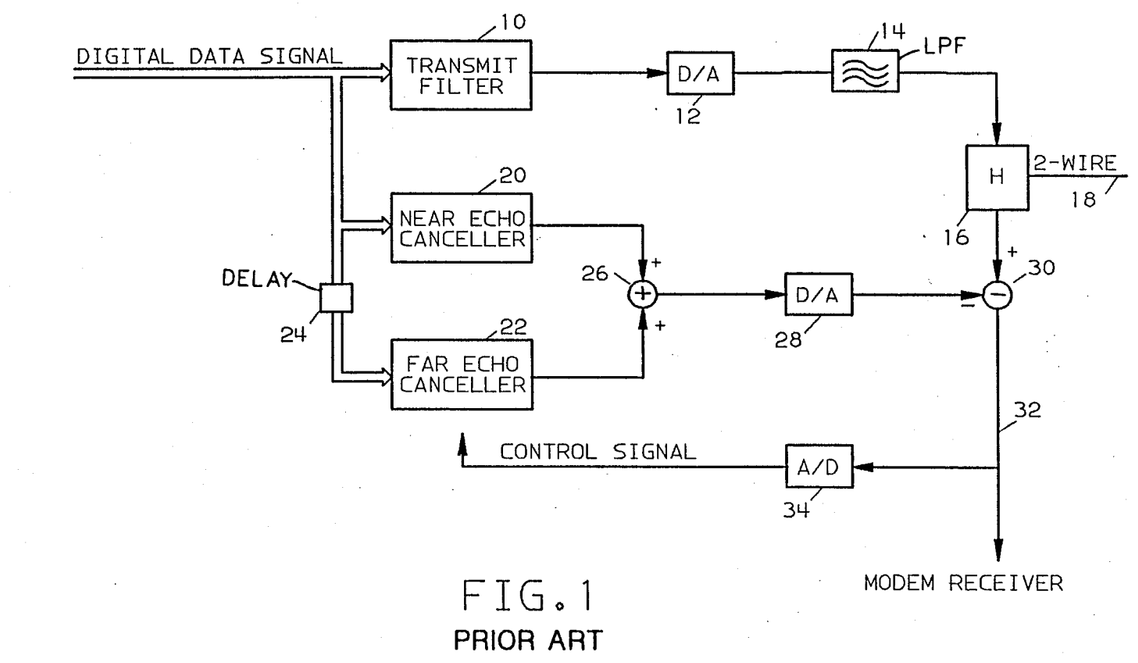
FIG. 1 is a simplified block diagram of a data transmission system incorporating a conventional echo cancelling device.

FIG. 1 is a block diagram of a conventional echo cancelling system used with a system transmitting over a two-wire medium. The digital signal in complex form, that is with the in-phase and quadrature components, is provided to the two-wire line 18 via transmit filter 10, digital-to-analog converter 12, low pass filter 14, and hybrid coupler 16. It must be noted that the output of transmit filter 10 is a real signal and is shown as one line, whereas the complex signal at its input is shown as a double line. Such a representation will be used in the whole description. Also, it must be noted that the same means will always be designated by the same references in the figures.

As echoes arise due to impedance mismatches in the hybrid couplers such as 16, the incoming signal received on line 18 is composed of three different signals the far signal transmitted from the remote modem, the near echo resulting from the outgoing signal leaking directly through hybrid 16, and the far echo resulting from the transmitted signal reflecting on a far hybrid coupler.

Because near and far echoes have different characteristics, it is convenient to break the echo canceller into two parts, the near echo canceller 20 and the far echo canceller 22. Both echo cancellers are generally implemented as digital transversal filters with adaptive coefficients, separated by a bulk delay 24 equal to the round trip delay. Note that, as filters, the near and far echo cancellers receive as inputs the signal in complex form, and provide as outputs only a real signal.

The outputs of near echo canceller 20 and far echo canceller 22 are added in adder 26, the output of which is converted into an analog signal by digital-to-analog converter 28. The resulting analog signal which is an estimated value of the actual echo (near and far) is subtracted from the incoming signal received from the 2-wire line 18, via hybrid 16, in subtracter 30. The output of subtracter 30 on line 32 is theorically the incoming signal free of echo and therefore, can be demodulated and decoded to recover the data transmitted by the remote modem. In fact, there is always an error between the actual value of the echo and the estimated value. This error signal is used, after digital conversion in analog-to-digital converter 34 as a control signal for adapting the coefficients of near and far echo cancellers 20 and 22.

The echo cancelling of FIG. 1 has several drawbacks. Indeed, the analog incoming signal from the remote modem has generally an energy level range between −6 dBm and −43 dBm, the near echo signal has the same energy level range (but independent) and the far echo signal has an energy level at least 10dBm lower than the energy level of the remote incoming signal. An analog-to-digital converter such as converter 34 has a limited precision which does not apply on the whole energy level range. Thus, if the converter is adapted to receive a signal of −6dBm as a maximum energy level, only 5 significant bits will be provided by the analog-to-digital converter with an input signal at −43 dBm, which is very insufficient. Accordingly, it would be necessary to include a programmable gain amplifier (PGA) before analog-to-digital converter 34 so as to fully utilize the A/D converter dynamic range regardless of the energy level of the incoming signal. Such a PGA would require inclusion of a selectable gain attenuator after the digital-to-analog converter 28.

A programmable gain amplifier (PGA) located before converter 34 would receive the error between the actual value and the estimated value of the echo, as an input when the modem is in training mode. The PGA value is set at the beginning of the transmission, by measuring the signal energy at the A/D converter output signal. It may happen that, because of a noise burst for instance, this energy measurement might not be accurate, especially if fast set-up is required, resulting in a bad adjustment of the PGA. Thus, observing a signal with low energy at the A/D converter output may result from either a good cancellation of the echo, or from a bad adjustment of the PGA, without the possibility of distinguishing between the two possibilities.

Figure 2:
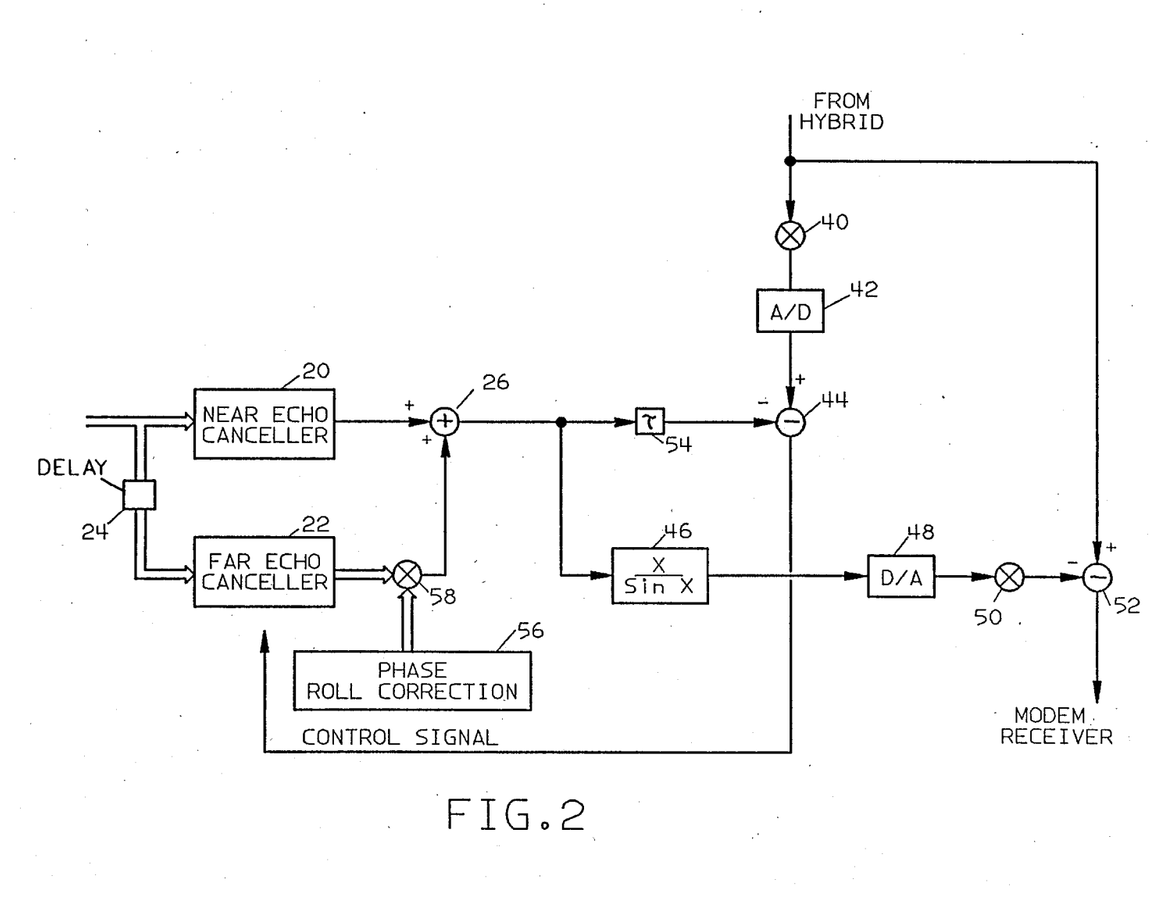
FIG. 2 is a schematic diagram of the echo cancelling device incorporating the present invention.

The above drawback is overcome by the embodiment shown in FIG. 2. In this implementation, the circuit path used to adapt the coefficients of the echo cancellers is separated from the circuit path for receiving the incoming signal to be processed by the modem receiver.

The incoming signal from the hybrid is directly used as input to Programmable Gain Amplifier (PGA) 40, the output of which is converted into digital form by analog-to-digital converter 42. Thus, the energy level at the input of converter 42 is independent of the cancellation rate provided by the echo canceller. Generally, PGA 40 is set once at initial training according to the near echo level. But other settings may be required for avoiding saturations when full-duplex transmission occurs.

Then, the digital estimated echo value provided by adder 26 after addition of the estimated near echo value from near echo canceller 20 and the estimated far echo value from far echo canceller 22, is subtracted from the digital incoming signal provided by converter 42, in subtracter 44. The resulting signal is then used as a control signal for adapting the coefficients of near and far echo cancellers 20, 22.

Another drawback which is overcome by the embodiment shown in FIG. 2 is that a digital-to-analog converter such as converter 28 (see FIG. 1), introduces a frequency distortion of the type SinX/X on the generated echo signal. Such a distortion is not corrected by the A/D converter 34, and therefore, the control signal for adjusting the echo canceller coefficients is a filtered version of the true signal which leads to an imperfect echo cancellation especially when the sampling frequency is low. As shown on FIG. 2, the estimated echo signal at the output of adder 26 is filtered by digital filter 46, the transfer function of which is of the type X/SinX. The filtered signal provided by filter 46 is provided to digital-to-analog converter 48. A selectable gain attenuator (SGA) 50 with a gain which is the reciprocal of PGA 40 gain, is located at the output of converter 48 so as to compensate the effect of PGA 40. The attenuated signal provided by SGA 50 is then subtracted from the incoming signal coming from the hybrid by subtracter 52, the resulting signal free of the echo signal being sent to the modem receiver for demodulation. Thus, the SinX/X shaping introduced by the digital-to-analog converter is compensated in a circuit path which is independent of the echo canceller adjustment loop, thereby overcoming the drawback mentioned above. In fact, filter 46 introduces a delay $\tau$ in the circuit path, which must be compensated in the circuit path used for the echo canceller adjustment by a delay circuit 54. Delay $\tau$ has been measured as 2T, T being the baud time.

As the far echo may be affected by a frequency shift due to the frequency changes in the 4-wire carrier system, some phase-roll tracking is needed. A phase-roll correction circuit 56 provides a correction signal of the form $\exp(j\phi)$ which is used as multiplying factor of the estimated far echo signal in multiplier 58. Such a phase-roll correction circuit will be described in detail later on in the description.

The analog-to-digital and digital-to-analog converters of FIG. 2 operate synchronously with the modem transmitter clock which provides pulses at a frequency satisfying the sampling theorem constraints and being an integer multiple of the modulation rate. Assuming that the modulation rate is 2400 bauds, the smallest possible value for the sampling frequency is therefore 7200Hz, 9600Hz.... For a sake of accuracy, the sampling frequency used in the following will be chosen as 9600Hz.

Thus, near echo canceller 20 or far echo canceller 22 receives a complex signal corresponding to one constellation point per baud time, that is each 1/2400 s in the present embodiment, and has to provide four samples of a real signal per baud time, that is each 1/9600 s.

The type of echo canceller which is widely used is referred as a pass-band data-driven filter. Such a filter behaves exactly as a modem transmitter filter, except the fact that its coefficients are adaptive. For a given time span of the echo canceller filter, the number of filter coefficients to be used is proportional to the sampling frequency to signalling frequency ratio. Assuming a total echo duration of 45ms (108 baud times), the number of adaptive coefficients required with a sampling frequency of 9600Hz is 108×4=432. With the requirement that these coefficients are adapted each baud time, this is a burden which is not easily manageable by the modem processor.

Figure 3:
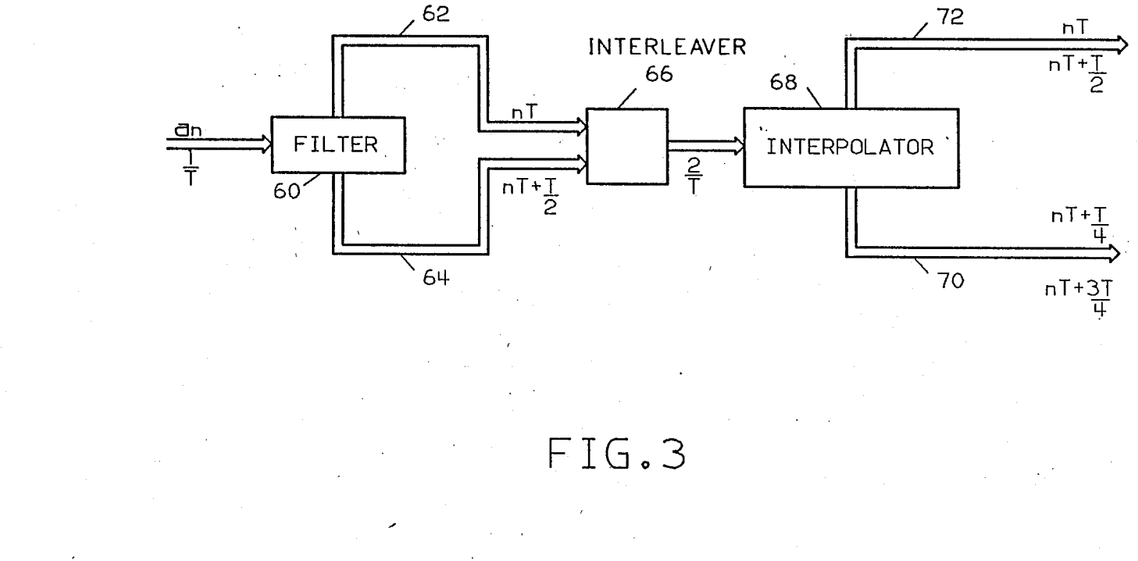
FIG. 3 depicts the structure of the echo canceller shown on FIG. 2.

A system enabling the number of echo canceller coefficients to be reduced without a loss in the accuracy is shown in FIG. 3. Such a system comprises an adaptive transversal filter combined with an interpolator. The complex signal composed of data symbol coordinates is input into adaptive filter 60 at the rate of 1/T. Filter 60 has two outputs 62 and 64. The samples on outputs 62 and 64 are interleaved by interleaving block 66 so that the samples on output 62 are taken at times nT and the samples on output 64 are taken at times nT+T/2. These samples are then used as inputs (at the rate of 2/T) to interpolator 68 which derives two interpolated samples at times nT+T/4 and nT+3T/4 on output 70, whereas output 72 provides samples at time nT and nT+T/2.

This system saves important computing time insofar as the number of coefficients to be computed each baud time is divided by two, the coefficients of the interpolator being computed once as explained later on.

It should be noted that the adjustment of the echo canceller coefficients is generally carried out at the beginning of the data transmission, that is when a training sequence is sent from the local modem to the remote modem, while the latter modem does not transmit any information. The coefficients are then frozen during the data exchange between the two modems.

Figure 4:
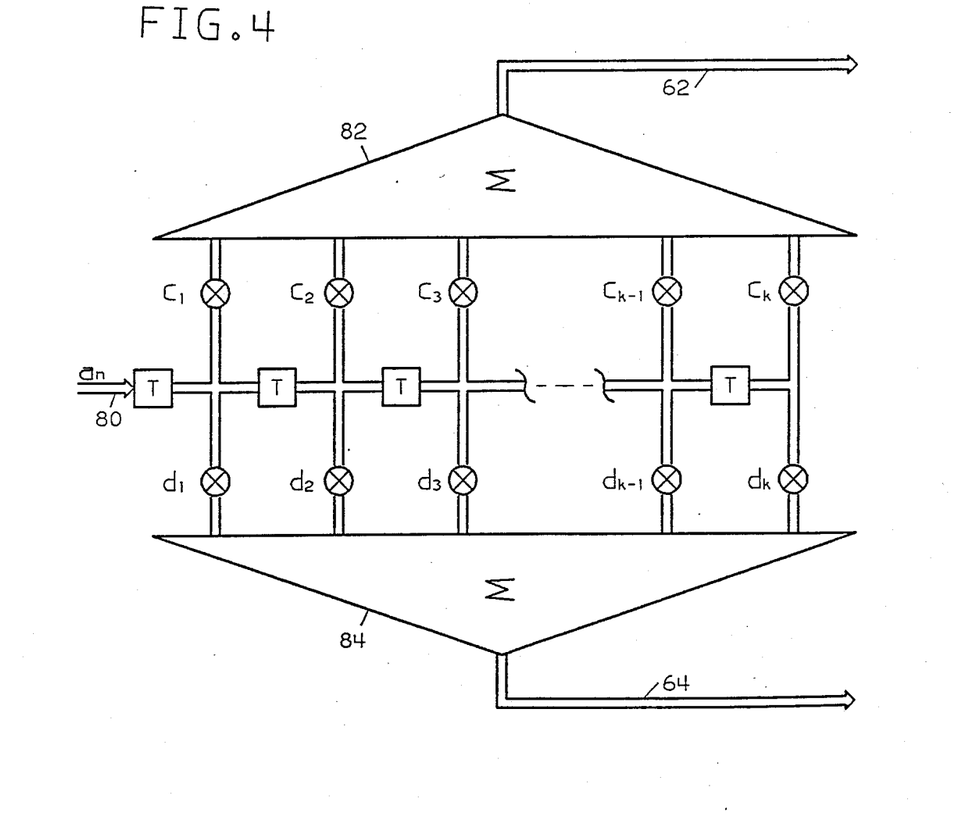
FIG. 4 is a schematic diagram of the pass-band transversal filter comprised in the echo canceller of FIG. 3.

An adaptive transversal filter which can be used in the echo canceller is shown in FIG. 4. The complex data symbols $a_n$ arrive at the input of delay line 80 composed of delay cells T, at the rate of 1/T (in the embodiment 2400). There are two parts in the filters, the 'even' filter with taps corresponding to complex coefficients c1, c2,...ck, and the 'odd' filter with taps corresponding to complex coefficients d1, d2,...dk. The outputs of the 'even' taps are summed up by adder 82 to provide on output 62 the output signal $S(n,o)$ at time nT, given by $$S(n,o) = \sum_{j=1}^{k} a_{n-j} \cdot c_j$$

The outputs of the 'odd' taps are summed up by adder 84 to provide on output 64 the output signal $S(n,2)$ at time $nT + T/2$, -continued given by $$S(n,2) = \sum_{j}^{k} a_{n-j} \cdot d_j$$

Figure 5:
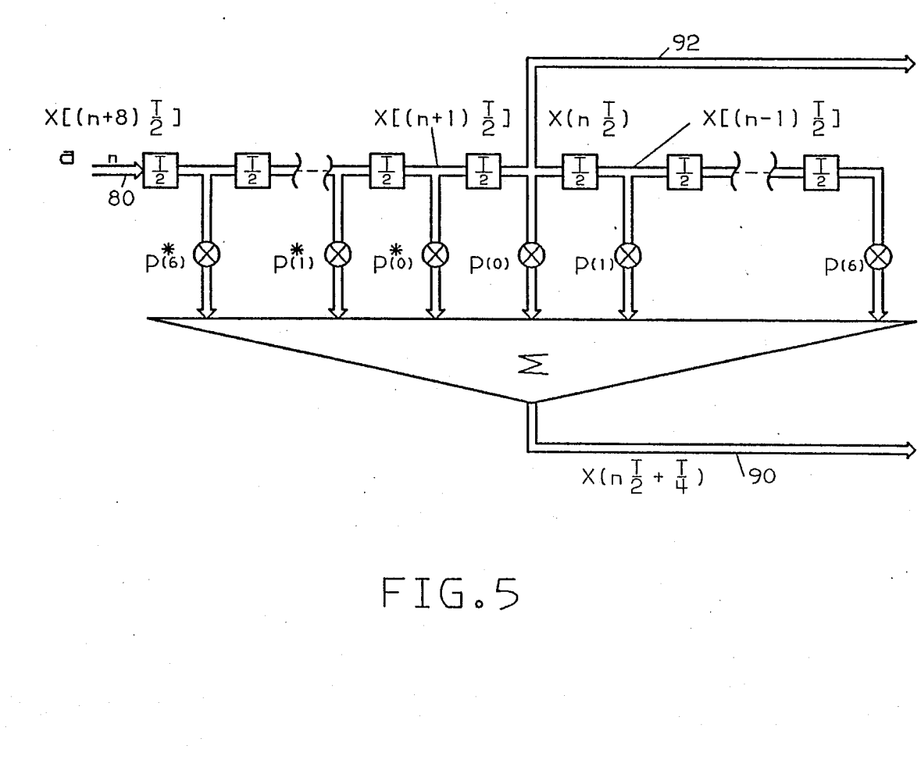
FIG. 5 is a schematic diagram of the interpolator comprised in the echo canceller of FIG. 3.

The interpolator 68 is now described in reference to FIG. 5.

The interpolation is first considered in the case of baseband signals. The signals provided by the adaptive transversal filter of FIG. 4, are received at input of the interpolator at times nT and nT+T/2.

Given a sequence of signal samples

...X[(n+1)T/2], X[nT/2], X[(n−1)T/2]...

the problem is to derive an estimate of the signal

X[n T/2+T/4]

Such an estimate is taken as a linear combination of the actual signal samples :

$$X[nT/2 + T/4] = \sum_{k=0}^{L} p_k X[(n-k)T/2] + q_k X[(n+k+1)T/2]$$

The above equation simply represents the operation of a conventional transversal filter with 2L+2 taps, with a tap spacing equal to T/2 (here 1/4800s). This filter is taken symmetrical ($p_k = q_k$), so that the problem is to find the set of coefficients $p_k$ that minimizes the mean-square error.

$$\epsilon^2 = E < X[nT/2 + T/4] - \sum_{0}^{L} p_k \{X[(n-k)T/2] + X[(n+k+1)T/2]\} > 2$$

where E represents the mathematical expectation over all possible transmitted data sequences.

The computation of coefficients $p_k$ by means of the signal autocorrelation function is easy for the skilled man, and will not be developed here.

Then, the passband interpolator coefficients are simply derived from the baseband coefficients by modulating them by the carrier frequency fc, which yields a complex filter with coefficients p(k)=p1(k)+jp2(k) and p(k)=p1(k)−jp2(k)

given by p1(k)=$p_k$ Cos 2'fc(T/4+kT/2)

p2(k)=$p_k$ sm 2'fc(T/4+kT/2)

With a complex passband signal X1(nT/2)+jX2(nT/2) at the interpolating filter input, the interpolated samples X1(nT/2+T/4)+jX2(nT/2+T/4) are obtained through the following equations :

$X_1 (nT/2 + T/4) =$ $$\sum_{0}^{L} p_1(k) < X_1 [(n - k)T/2] + X_1 [(n + k + 1)T/2]> -$$

-continued $$p_2(k) < X_2[(n - k)T/2] - X_2[(n + k + 1)T/2] >$$

$$X_2(nT/2 + T/4) =$$

$$\sum_0^L p_1(k) < X_2[(n - k)T/2] + X_2(n + k + 1)T/2 > +$$

$$p_2(k) < X_1[(n - k)T/2] - X_1[(n + k + 1)T/2] >$$

These equations represent the operation of a complex transversal filter with symmetric (real parts) and antisymmetric (imaginary parts) coefficients.

With L=6, the coefficients p1(k) and p2(k) are given in Table I.

TABLE I

| | |
|---|---|
| $p_1(0) = 0.240203$ | $p_2(0) = 0.579902$ |
| $p_1(1) = 0.172398$ | $p_2(1) = 0.071410$ |
| $p_1(2) = 0.081660$ | $p_2(2) = -0.033825$ |
| $p_1(3) = 0.016588$ | $p_2(3) = -0.040047$ |
| $p_1(4) = -0.007437$ | $p_2(4) = -0.017953$ |
| $p_1(5) = -0.006587$ | $p_2(5) = -0.002728$ |
| $p_1(6) = -0.001579$ | $p_2(6) = 0.000654$ |

Such an interpolator introduces a delay in the reconstruction of the signal. This delay must be equal to an integer number of symbol intervals. One dummy delay has been added for that purpose, as shown on FIG. 5, so that the interpolator delay equals to 4T.

Interpolator 68 provides the interpolated samples X(nT/2+T/4) on output 90 whereas samples X(nT/2) are obtained on output 92.

Figure 6:
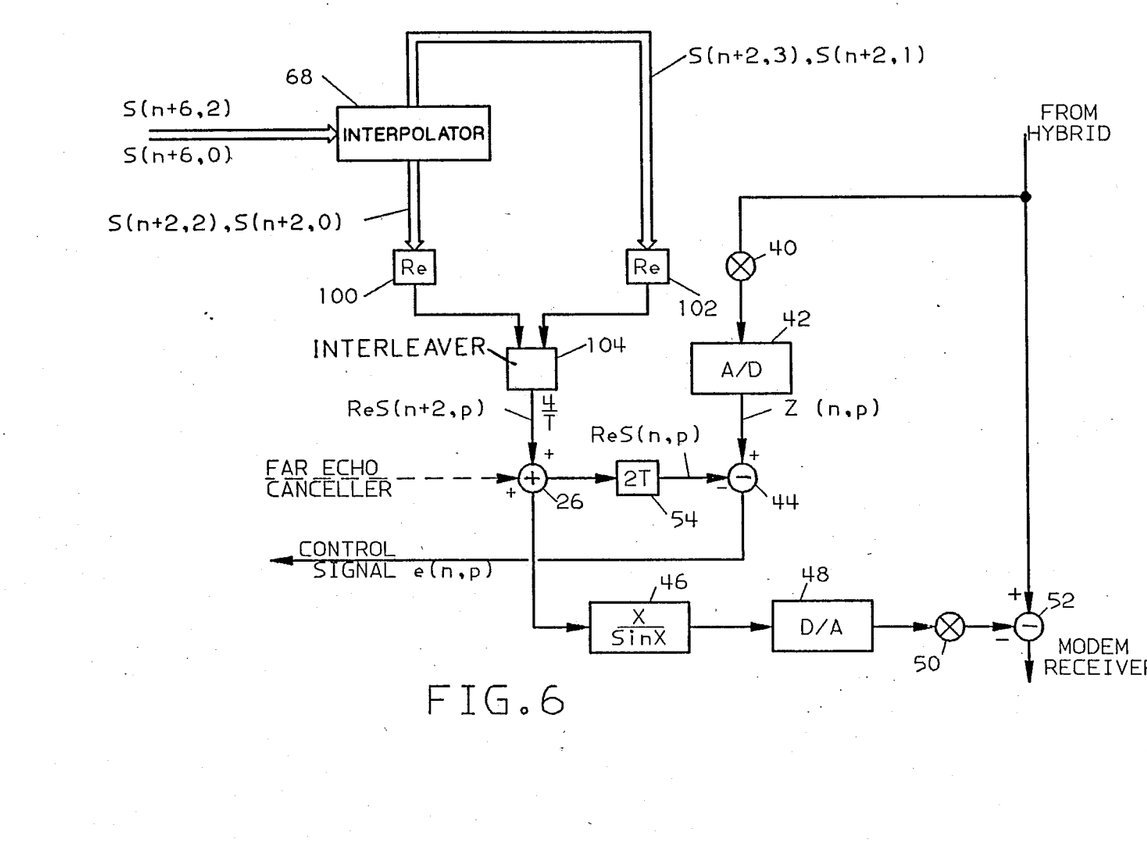
FIG. 6 is a block diagram showing the time data flow of the samples provided at the output of the near echo canceller.

In reference to FIG. 6, the sample data flow is now described from the input of the interpolator of the near echo canceller to the control signal obtained at the output of subtracter 44.

Within the same baud time, two samples S(n+6,0) and S(n+6,2) are input into interpolator 68, the latter derives two interpolated and delayed samples S(n+2,1) and S(n+2,3) on one output and two only delayed samples S(n+2,0) and S(n+2,2) on the other output. The real part of the two non-interpolated samples is taken in block 100, whereas the real part of the two interpolated samples is taken in block 102. It must be noted that the rank n+6 of the sample of the interpolator, and the rank n+2 at its output indicates the delay of 4 baud times introduced by the interpolator.

Then, the interpolated samples and the non-interpolated samples are interleaved by interleaving block 104 to provide the 4 real samples each baud time required for D/A conversion; that is Re S(n+2, p) with p being 0,1,2 or 3.

After being added to the corresponding samples from far echo canceller in adder 26, samples Re S(n+2,p) are delayed bt 2T (corresponding to the delay introduced by X/SinX filter 46) in block 54 so that within the same baud time, 4 real samples Re S(n,p) with p=0,1,2 or 3 are provided to subtracter 44.

Concomitantly with the samples Re S(n,p), A/D converter 42 produces 4 real-valued samples Z(n,p) per baud time, from which 4 error signals e(n,p) are derived in subtracter 44 :

$$e(n,p) = Z(n,p) - ReS(n,p)$$

(with p=0,1,2 or 3).

The near echo canceller coefficients ck and dk (see FIG. 4) must be adjusted to minimize the mean-square error $$<e^2> = E<e_{hu 2}(n,0) + e^2(n,2)>$$

where E is the mathematical expectation over all possible data sequences. It must be noted that the error signal corresponding to the interpolated samples are not necessary for adjusting the echo canceller coefficients.

Figure 7:
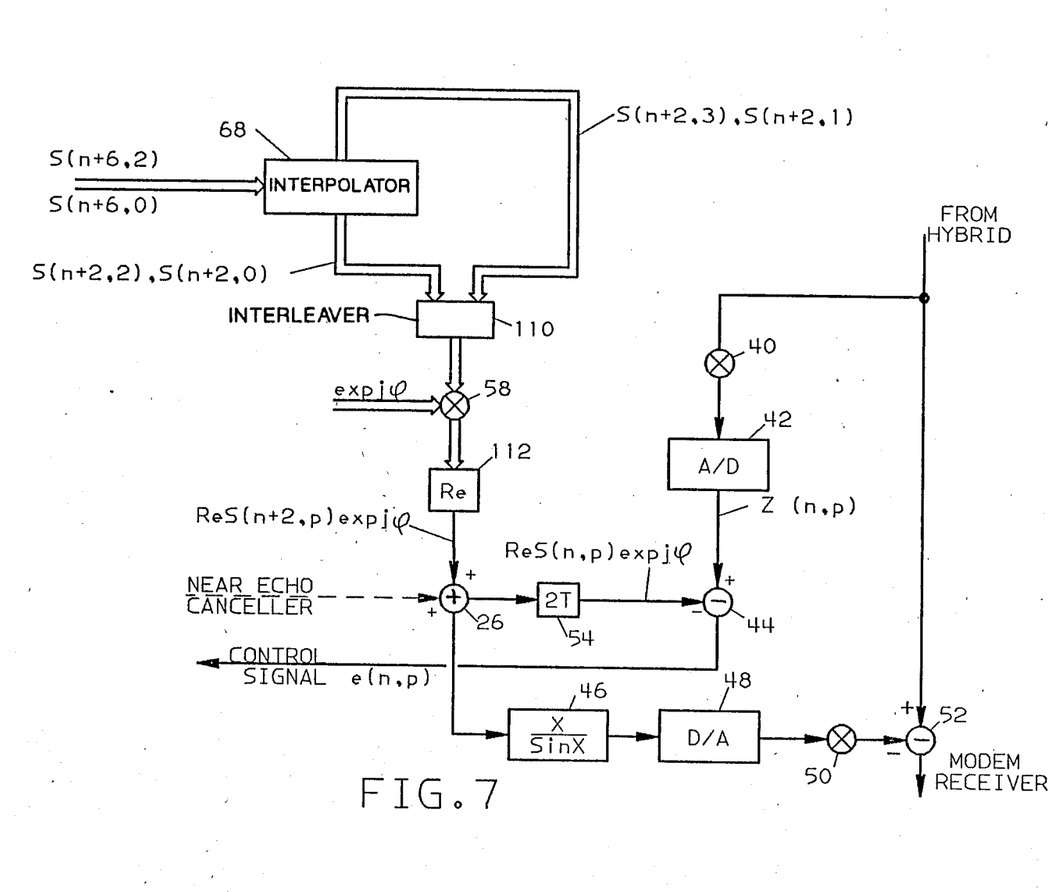
FIG. 7 is a block diagram showing the time data flow of the samples provided at the output of the far echo canceller.

FIG. 7 shows the sample data flow for the far echo canceller. The difference with the near echo canceller results from the fact that the far echo canceller has to eliminate echoes affected by phase-roll.

The interpolated samples and the non-interpolated samples from interpolator 68 are interleaved by interleaving block 110 to provide 4 complex samples per baud time. These samples are rotated by time varying angle $\phi(n,p)$ (p being 1,2,3 or 4) by multiplying each complex sample S(n+2,p) by exp $j\phi(n,p)$ in multiplier 58. The real part of the resulting signal is taken in block 112 to provide the 4 real samples per baud time required for D/A conversion. Then, the operations are the same as for the near echo canceller case illustrated by FIG. 6.

Nevertheless, it must be noted that the error samples e(n,p) produced at the output of subtracter 44 have to be multiplied by the complex factor exp($-j\phi$) before being used as control signals for adjusting the coefficients of the far echo canceller, so as to compensate for the factor exp $j\phi$ by which the samples produced at the output of the far echo canceller have been multiplied.

The phase-roll correction circuit is now described in connection with FIGS. 8, 9 and 10.

Figure 8:
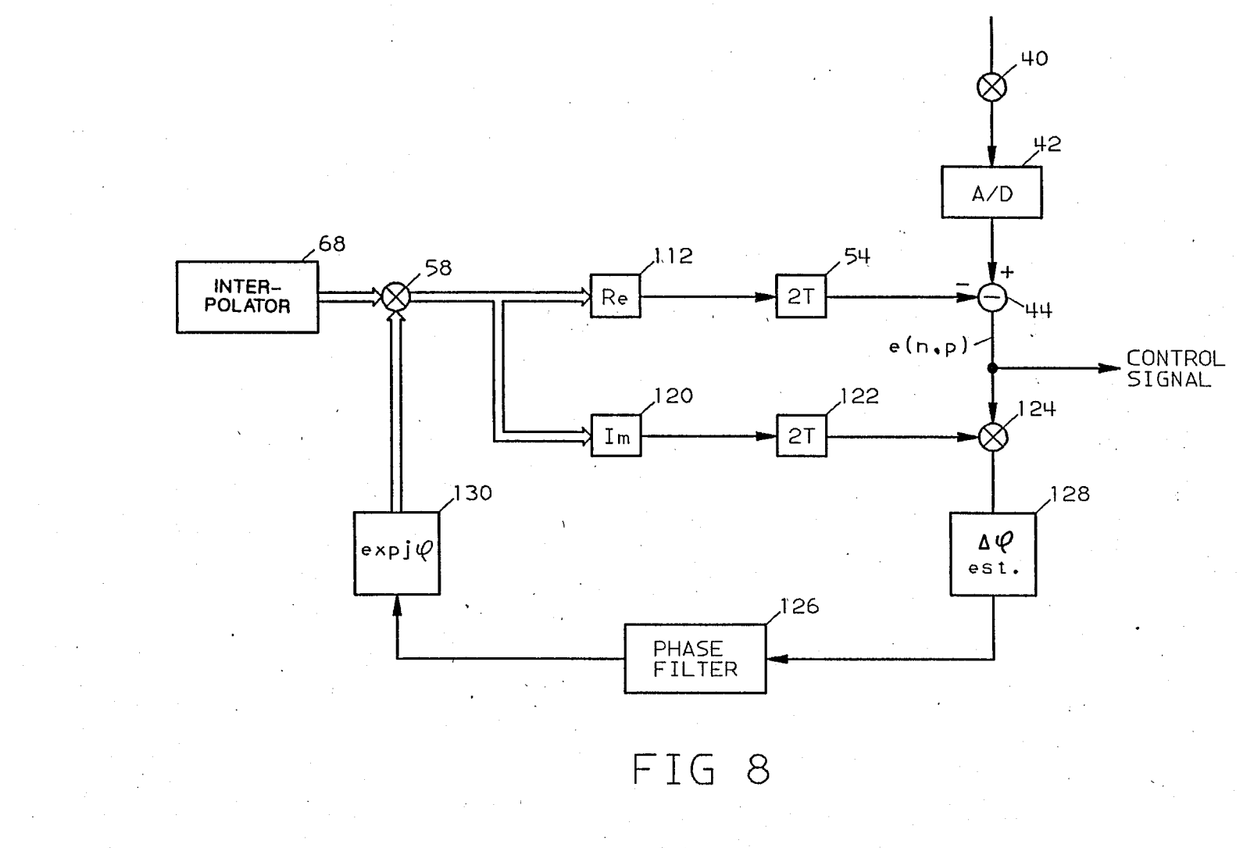
FIG. 8 is a block diagram showing the echo cancelling device with the phase-roll correction according to the invention.

As shown in FIG. 8, the complex samples S(n+2,p) produced by interpolator 68 of the far echo canceller are multiplied by exp $j\phi$ in multiplier 58, with $\phi$ being the phase-roll value generated by the phase-roll correction circuit according to the invention.

Whereas the real part of the complex samples S is taken in circuit 112, delayed (2T) by delay circuit 54 and subtracted from the digital incoming signal provided by analog-to-digital converter 42, to produce four samples e(n,p) each baud time, p being 0,1,2 or 3, $$e(n,p) = Z(n,p) - ReS(n,p).expj\phi,$$

the imaginary part of the complex samples S is taken in circuit 120 for the reasons now explained.

Let $\epsilon^2$ the mean-square error be :

$$\epsilon^2 = E<e^2(n,0) + e^2(n,1) + e^2(n,2) + e^2(n,3)>$$

where E denotes the mathematical expectation over all possible data sequences.

The phase control signal is the derivative of the mean-square error with respect to $\phi$.

This leads to a phase control signal of the form :

$$\frac{d}{d\phi} = \Delta\phi = e(n,p) \cdot ImS(n,p)$$

Therefore, the imaginary part of complex samples S provided by block 120 are delayed by 2T in delay element 122 (the same delay as the delay introduced by delay element 54 on the real part of samples S), and multiplied by e(n,p) in multiplier 124.

Then, a second-order phase-locked loop must be used to lock on zero steady-state phase error. Such a phase-locked loop is implemented in the phase filter described in U.S. Pat. No. 3972000 of title "Phase filter for reducing the effects of the noise components altering discrete phase modulated signals". Accordingly, the variations of the phase-roll provided at the output of multiplier 124 are input to phase filter 126 (of the type described in U.S. Pat. No. 3972000) via Δφ estimator 128, the description of which will be made later on. The phase-roll value φ provided by phase filter 126 is then converted into exp jφ by converting element 130, before being used as multiplying factor of the complex samples S in multiplier 58.

As already mentioned, the frequency shift due to the phase-roll is generally low, about 0.1 Hz. Nevertheless, without correction the phase-roll values can acccumulate and lead to generating an estimated echo value which is completely out of phase with the incoming signal, so that the estimated echo signal happens to added (and not subtracted) to the incoming signal in subtracter 44. Therefore, it is necessary to track the phase-roll even in full duplex transmission when a signal is received from the remote modem.

As the value of the signal e(n,p) supplied by subtracter 44 is very different according to whether the transmission is only half duplex (there is no remote signal and the value is very low), or full duplex (the value is principally due to the remote signal and is much higher), Δφ estimator 128 is different in half duplex and in full duplex.

Figure 9:
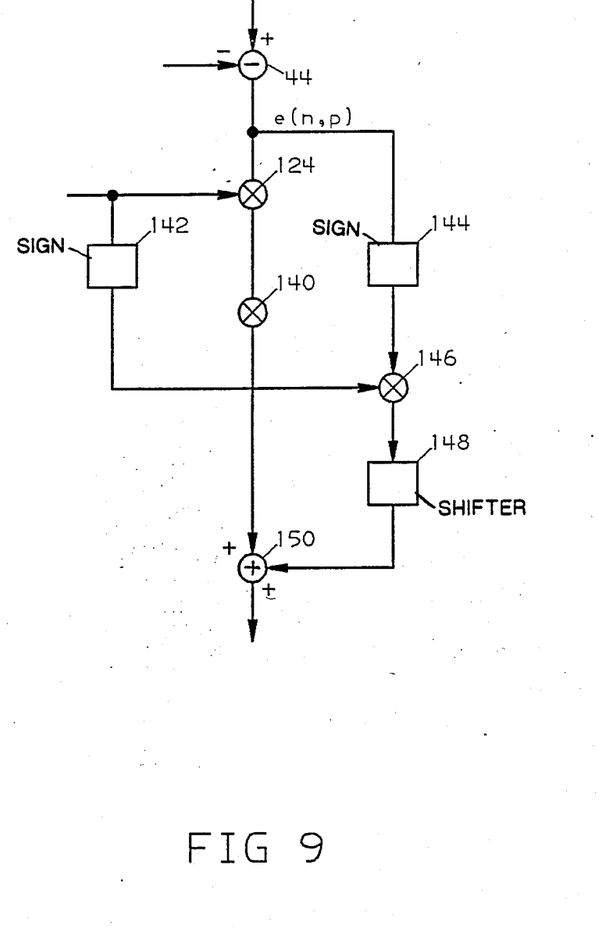
FIG. 9 is a schematic diagram showing the estimator of phase variation in half-duplex data transmission.
Figure 10:
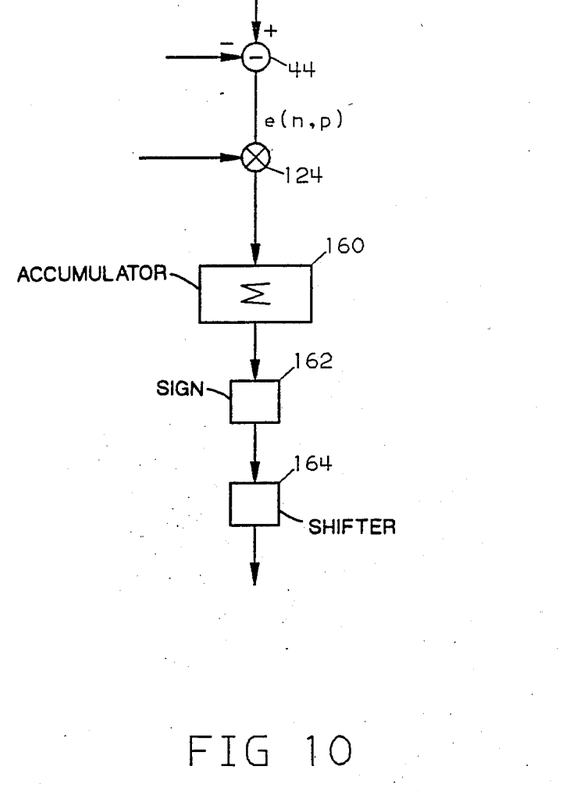
FIG. 10 is a schematic diagram showing the estimator of phase variation in full-duplex data transmission.

In half-duplex, when training sequence is sent from the local modem to the remote modem, Δφ estimator 128 such as described in FIG. 9, is used.

In the majority of cases, the input of programmable gain amplifier 40 and converter 42 (see FIG. 8), will be set according to the near echo level, and sometimes according to the far signal level when the modem hybrid coupler happens to be well-matched to the line impedance, but never according to the far echo level which is 10 dB lower than the far signal level. It is therefore necessary to introduce a gain γ (multiplier 140).

Because there is a transient time during which both the estimated far echo and the error e(n,p) have not reached their optimum values, it would be necessary to have a variable gain γ. One possible, but unpractical strategy, would be to have the gain γ adaptive, or selected by table look-up according to the far echo energy. Another approach which is an important feature of the invention, has been implemented in FIG. 9.

This approach consists in mixing "proportional" estimation and "binary" estimation. The sign of the estimated far echo value is taken in block 142 whereas the sign of the error e(n,p) is taken in block 144. The two signs are multiplied in multiplier 146. The resulting value, which is +1 or −1, is left shifted by a number k of positions, k=3 being a suitable solution in shifter 148. The values supplied by multiplier 140 on the one hand, and from shifter 148 on the other hand, are then added in adder 150 in order to provide the variation Δφ which will be used as input to phase filter 126 (see FIG. 8). Thus, the proportional estimation is in effect (because preponderant) when the far echo level is relatively large and the error signal is also relatively large, whereas the binary estimation is in operation when the far echo level and/or the error signal are small.

As mentioned here-above, the phase-roll correction cannot be interrupted when the modem operates in full-duplex mode, i.e. in the presence of the remote signal. An approach for this phase-roll tracking is given in connection with FIG. 10.

The signal values coming from multiplier 124, which are, for the reasons explained above, the products e(n,p). Im S(n,p) computed four times each baud time, are accumulated in accumulator 160 during a number M of baud times. At each Nth baud, the sign of the contents of accumulator 160 is taken by block 162, and left shifted (one or two positions) in shifter 164 whereas accumulator 160 is reset. The value at the output of shifter 164 is used as a correct estimation of the variation Δφ as input of phase filter 126. It must be noted that during the N baud times accumulator 160 is operating, the phase filter is free-running i.e. its input signal is equal to zero.

The present implementation is based upon the fact that the influence of the remote data signal, which is included in the incoming signal when in full-duplex, can be ignored if the values are accumulated during a sufficiently high number of baud times. It has been recognized that a number M=512 gives a very good estimation of the phase-roll variation.

All the data signal processing in the present day modems, and in particular the processing required to implement the present invention, is performed digitally under the control of a processor incorporated in the modem. Though such a processor is generally a general purpose processor, a man skilled in the art will understand that a special purpose processor can be implemented using the teachings of the present description.

What is claimed is:

1. In a data transmission system connected to a two-wire line portion of a transmission medium over which the transmission of an outgoing signal in analog form which has been converted from an outgoing signal in digital form can be made simultaneously with the reception of an incoming signal in analog form, said system operating in half-duplex mode wherein the incoming signal in analog form is an echo signal produced by said transmission medium in response to the outgoing signal in analog form, an echo cancelling device for generating an estimated echo signal, providing a phase-roll corrected echo signal and subtracting the real component of said phase-roll corrected echo signal from said incoming signal in analog form to form an error signal, said echo cancelling device being characterized in that it includes a phase-roll tracking device comprised of:

phase rotating means (58) for rotating the phase of the estimated echo signal by a value X which is the estimated phase-roll value, thereby providing a complex signal representative of said phase-roll corrected echo signal;

multiplying means (124) for multiplying said error signal by the imaginary component (120) of said phase-roll corrected echo signal, thereby providing a value Y which is representative of the variation of the phase-roll;

a phase variation estimator (128) providing an estimation of the phase-roll variation Z in response to said value Y, said phase variation estimator (128) operating in half duplex mode and including:

a gain device (140) which provides a value proportional to said value Y, which is taken as said estimation of the phase-roll variation Z when both said phase-roll corrected echo signal and said error signal are relatively large; and a multiplier (146) for providing the product of the sign bit (142) of the phase-roll corrected echo signal and the sign bit (144) of the error signal, said product being taken as said estimation of the phase-roll variation Z when said phase-roll corrected echo signal and/or said error signal are small; and a phase filter (126) providing said estimated phase-roll value X in response to said estimation of the phase-roll variation Z.

2. Echo cancelling device according to claim 1 further comprising a shifter (148) for left shifting by a number k of positions said estimation of the phase-roll variation Z provided by said multiplier (146), thereby providing a new estimation of the phase-roll variation Z' which is a multiple ($2^k$) of said estimation of the phase-roll variation Z.

3. In a data transmission system connected to a two-wire line portion of a transmission medium over which the transmission of an outgoing signal in analog form which has been converted from an outgoing signal in digital form can be made simultaneously with the reception of an incoming signal in analog form, said system operating in full-duplex mode wherein said incoming signal is composed of a signal in analog form received from a remote system and an echo signal produced by said transmission medium in response to said outgoing signal in analog form, an echo cancelling device for generating an estimated echo signal, providing a phase-roll corrected echo signal and subtracting the real component of said phase-roll corrected echo signal from said incoming signal in analog form to form an error signal, said echo cancelling device being characterized in that it includes a phase-roll tracking device comprised of:

phase rotating means (58) for rotating the phase of the estimated echo signal by a value X which is the estimated phase-roll value, thereby providing a complex signal representative of said phase-roll corrected echo signal;

multiplying means (124) for multiplying said error signal by the imaginary component (120) of said phase-roll corrected echo signal, thereby providing a value Y which is representative of the variation of the phase-roll;

a phase variation estimator (128) providing an estimation of the phase-roll variation Z in response to said value Y, said phase variation estimator (128) operating in full duplex mode and including:

an accumulator (160) for accumulating said value Y during a number M of baud times, a sign element for taking the sign bit of the contents of said accumulator, said sign bit being taken as said estimation of the phase-roll variation Z; and a phase filter (126) providing said estimated phase-roll value X in response to said estimation of the phase-roll variation Z.

4. Echo cancelling device according to any one of the preceding claims wherein said outgoing signal in analog form results from a data signal having a modulation rate of 1/T, said echo cancelling device providing a number p of samples of said phase-roll corrected echo signal satisfying the sampling theorem in response to one sample received each baud time.

5. Echo cancelling device according to claim 4 wherein said modulation rate 1/T=2400, and p=4.

* * * * *